July 15, 1969

J. C. PEKAREK 3,455,335

CONSTANT FLOW FLUID DIVERTING VALVE

Filed Aug. 2, 1967

INVENTOR.
JOSEPH C. PEKAREK
BY
ATTORNEY

July 15, 1969     J. C. PEKAREK     3,455,335

CONSTANT FLOW FLUID DIVERTING VALVE

Filed Aug. 2, 1967     2 Sheets-Sheet 2

INVENTOR.
JOSEPH C. PEKAREK
BY Donald R. Fostrom
ATTORNEY

3,455,335
CONSTANT FLOW FLUID DIVERTING VALVE
Joseph C. Pekarek, Mount Prospect, Ill., assignor to Honeywell Inc., Minneapolis, Minn., a corporation of Delaware
Filed Aug. 2, 1967, Ser. No. 657,928
Int. Cl. F16k *11/14, 31/44*
U.S. Cl. 137—627.5                                  8 Claims

ABSTRACT OF THE DISCLOSURE

A four-pipe temperature conditioning system including heating and cooling fluid supplies, each with its own return, and a common heat exchanger utilized for both heating and cooling, and further including a fluid diverting valve having a plurality of tilting poppet valves selectively and sequentially operable by a single valve actuator to connect the heat exchanger across either the heating fluid supply and return or the cooling fluid supply and return and modulate the flow thereto, or to completely interrupt flow to the heat exchanger, and including a bypass arrangement for maintaining a constant flow of both heating and cooling fluids at all times and in all positions of the valve.

Background of the invention

This invention relates to a constant flow fluid diverting valve for controlling the flow of temperature conditioning fluid to a heat exchanger. Specifically, it relates to a unitary six-port valve for use in four-pipe heating and cooling systems and includes structure providing a bypass arrangement whereby a constant flow of heating and cooling fluid is maintained at all times and in all positions of the valve.

Various types of six-port valves for heating and cooling systems have been devised in the past. One of the better arrangements utilizes a plurality of tilting poppet valves sequentially operated by a plurality of cams which are in turn operated by a single actuator. This arrangement is disclosed in copending application Ser. No. 601,944 of Roland A. Gladstone and Richard C. Mott, filed Dec. 15, 1966, now U.S. Patent No. 3,411,537, and assigned to the assignee of the present invention. While the valve disclosed in the above mentioned application provided distinct advantages over prior valves, it did not provide a bypass feature so that a continuous flow of both heating and cooling fluids would be maintained. The desirability of providing this bypass feature has been recognized in the past and certain valves have been modified to add this feature. A spool valve so modified is disclosed in the Karl F. Gruner and Heinrich K. Lau application Ser. No. 628,719, filed Apr. 5, 1967, now U.S. Patent No. 3,411,538.

Brief summary of the invention

The valve of this invention combines the advantages of the valves disclosed in the two above noted pending applications. Specifically, it combines the simplicity of construction, relative compactness, relatively low operating force requirement and relative freedom from the effect of deposits from the material conveyed, the main features of the Gladstone and Mott valve, with the bypass feature provided by the valve of Gruner and Lau.

The valve includes a valve body which has first, second and third body portions each of which has three fluid passages. In each body portion valve seats separate the first and second, and the first and third fluid passages, and each of these valve seats has associated therewith a valve closure member movable between open and closed positions. An actuating means for the valve includes an actuating member which is movable between first, second and third positions to control the positions of all of the valve closure members. The actuating means includes first means associated with the closure members in the first body portion so that upon movement of the actuating member from its first to its second position, the first closure member therein is moved from open to closed position and the second closure member therein is moved from closed to open position and so that the two closure members therein are maintained in this position upon further movement of the actuating member from its second to its third position. The actuating means further includes means associated with the closure members in the second body portion so that the first closure member therein is maintained in closed position and the second closure member therein is moved from open to closed position upon movement of the actuating member from its first to its second positions, and so that the second closure member therein is maintained closed and the first closure member moved from closed to open position upon movement of the actuating member from its second to its third position. In addition, the actuating means includes further means associated with the closure members in the third body portion so that the first closure member therein is maintained open and the second closure member therein is maintained closed when the actuating member is in either its first or second positions, or any position therebetween, and so that upon movement of the actuating member between its second and third positions, the first closure member is closed and the second closure member opened.

In the preferred form of the invention, the valve closure members are poppet valves arranged to be tilted off their respective seats when opened and normally urged to a closed position by a spring. The sequencing of the valves is provided by a series of cams operated by the actuating member and the cams operating the valves in the first and third body portions are connected to the actuating member by means of lost motion connections.

Detailed description

Figure 1:
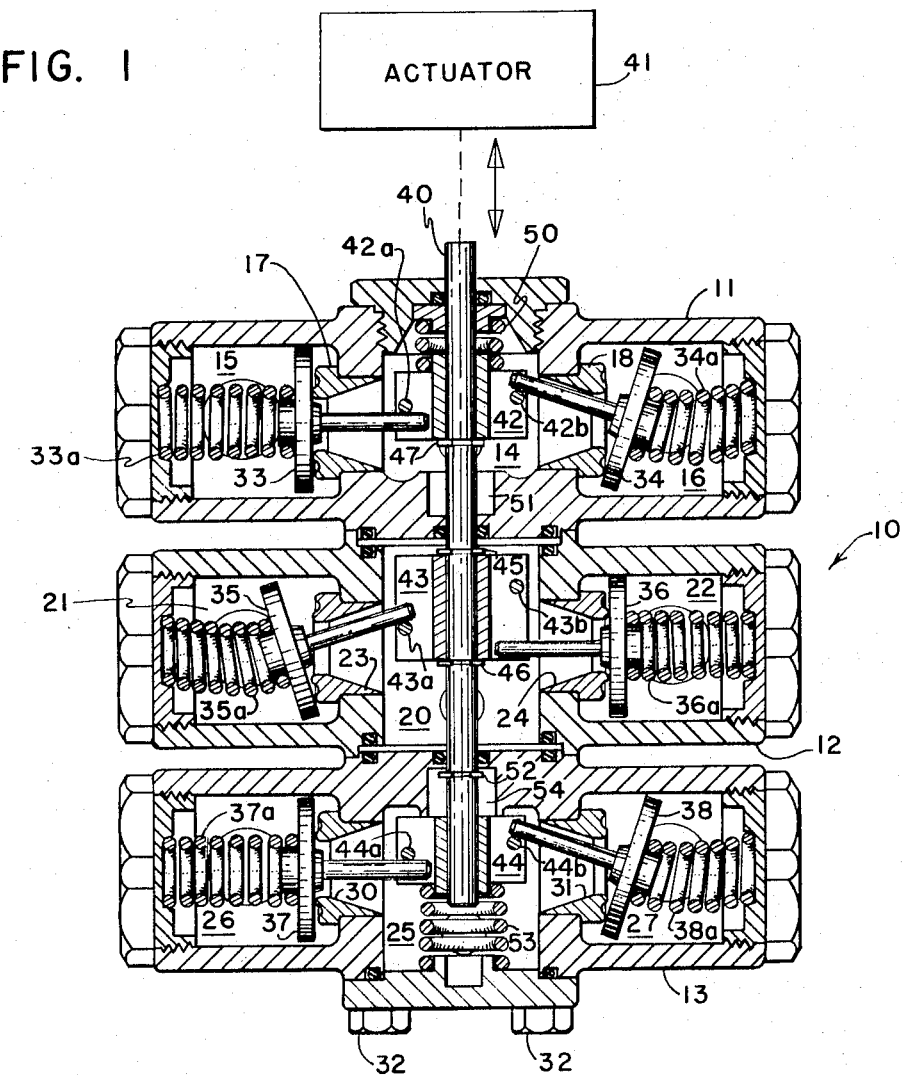
FIGURE 1 is a cross sectional view through the center of a valve constructed according to this invention and disclosing the structure thereof in detail.

Referring to the drawing, reference numeral 10 refers generally to a constant flow valve constructed according to this invention. The valve includes a body means which in its preferred form includes three substantially identical body portions 11, 12 and 13. Each of these body portions has formed therein three fluid passages. Body portion 11 has a first fluid passage 14, a second passage 15 and a third passage 16. A valve seat 17 separates passages 14 and 15 and a valve seat 18 separates passages 14 and 16. Similarly, body portion 12 has first, second and third passages 20, 21 and 22, respectively. A valve seat 23 separates passages 20 and 21 and a valve seat 24 separates passages 20 and 22. Body portion 13 has first, second and third fluid passages 25, 26 and 27, respectively. Passages 25 and 26 are separated by a valve seat 30 while passages 25 and 27 are separated by a valve seat 31. In the preferred form, the three substantially identical body portions are mounted one on top of another and passages 14, 20 and 25 are generally cylindrical passages and are axially aligned. The three body portions may be fastened together by appropriate means such as bolts 32, the heads of which can be seen at the bottom of body portion 13 in FIGURE 1. The second and third fluid passages in each of the body portions are generally cylindrical and lie diametrically opposed on opposite sides of the first chamber of that body portion with their axes generally perpendicular to the axis of the first passage. Each of the second and third fluid passages of each body portion has a poppet valve disposed therein and urged into engagement with the valve seat associated therewith, by a spring. Each of these poppet valves has a valve stem extending through the associated valve seat opening into the first fluid passage of that body portion. As will be explained in more detail hereinafter, these valve stems are engaged by cam members in order to open the valves in opposition to the associated springs. In body portion 11 poppet valves 33 and 34 cooperate with valve seats 17 and 18, respectively, and are urged into engagement therewith by springs 33a and 34a, respectively. In body portion 12 poppet valves 35 and 36 cooperate with valve seats 23 and 24, respectively, and are urged into engagement therewith by springs 35a and 36a, respectively. In body portion 13 poppet valves 37 and 38 cooperate with valve seats 30 and 31, respectively, and are urged into engagement therewith by springs 37a and 38a, respectively.

Movably mounted in the valve body, along the axis of fluid passages 14, 20 and 25, is an actuating member 40 which takes the form of a rod axially movable in the valve body. This rod is operably connected to an appropriate actuator 41 connected to impart bi-directional axial movement to actuating member 40. Disposed in fluid passages 14, 20 and 25, and operably connected to actuating member 40, are cam members 42, 43 and 44, respectively. As can be seen in FIGURE 1, each of these cam members includes a central cylindrical or collar portion which surrounds member 40 and has extending on either side thereof a flat portion with a forwardly extending cam pin. For example, cam member 42 has a pin 42a which cooperates with the stem of valve 33 and a pin 42b which cooperates with the stem of valve 34. Cam 43 has a pin 43a which cooperates with the stem of valve 35 and a pin 43b which cooperates with the stem of valve 36. Similarly, cam 44 has a pin 44a which cooperates with the stem of valve 37 and a pin 44b which cooperates with the stem of valve 38.

Cam member 43 is rigidly directly connected to actuating member 40 for axial movement therewith by appropriate means such as snap rings 45 and 46 on the upper and lower ends thereof, respectively. Cam member 42 is connected to actuating member 40 by a lost motion connection. This connection includes a snap ring 47 defining the limit of upward movement (as seen in FIGURE 1) of actuating member 40 with respect to cam member 42. A spring 50 acts upon the upper side of cam 42 and urges it into engagement with snap ring 47. Body member 11 is provided with a recess 51 surrounding actuating member 40 at the lower end of fluid passage 14. This recess provides an annular opening into which snap ring 47 moves after it has moved downwardly a predetermined distance from the position disclosed in FIGURE 1. When it reaches this position, the underside of cam member 42 engages the portion of body member 11 surrounding opening 51 and this defines the lowermost position assumed by cam member 42 while allowing actuating member 40 to continue to move downward as snap ring 47 moves into opening 51.

Cam member 44 is movably mounted on actuating member 40 in a similar manner. A snap ring 52 defines the limit of downward movement of actuating member 40 with respect to cam member 44. A spring 53 acts on the underside of cam member 44 and urges it upwardly on actuating member 40 toward engagement with snap ring 52. Body member 13 is provided with a recess 54 surrounding actuating member 40 at the upper portion of passage 25 so that in certain upper positions of actuating member 40 snap ring 52 extends into opening 54 while the uppermost position of cam member 44 is determined by its abutment with the surface of body portion 13 surrounding opening 54.

Figure 2:
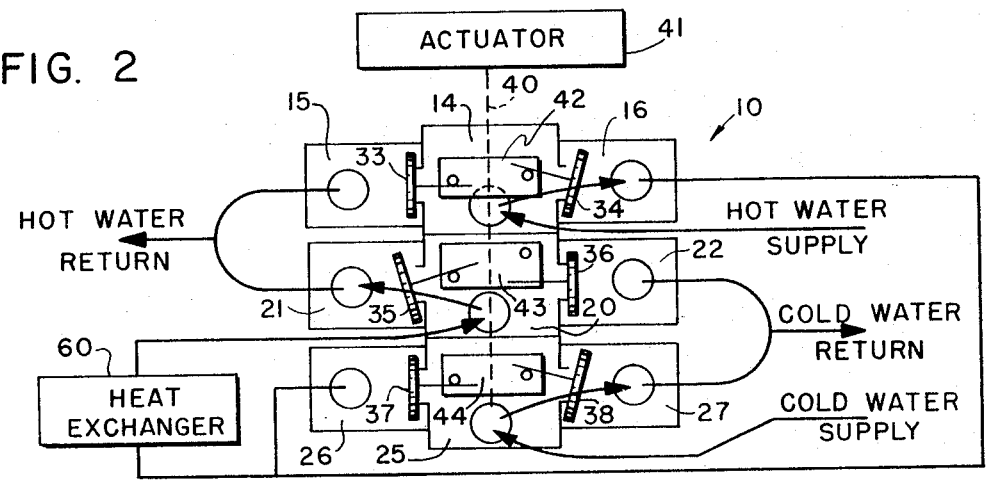
FIGURE 2 discloses schematically a four-pipe temperature control system utilizing the valve of this invention which is shown schematically therein in a first control position.

Each of the fluid passages in the valve body is provided with a port. The manner in which these ports are utilized is best seen in FIGURE 2 wherein the valve is disclosed schematically as it is incorporated into a four-pipe heating and cooling system which is also disclosed schematically. As seen therein, the port in fluid passage 14 is connected to a hot water supply pipe while the ports in passages 15 and 21 are connected to a hot water return pipe. FIGURE 2 discloses these two passages as being connected externally of the valve body and then connected to the hot water return but it will be understood that this connection may be made internally if desired. The port in fluid passage 25 is connected to an appropriate cold water supply pipe while the ports in passages 22 and 27 are connected together and connected to the cold water return pipe. The ports in passages 16 and 26 are connected to the inlet side of a heat exchanger 60, the outlet side of which is connected to the port in passage 20. Thus, it will be seen that body portion 11 constitutes a heating fluid distribution portion of the valve body with passage 14 being a heating fluid supply passage, passage 15 a heating fluid bypass return passage, and passage 16 a coil supply passage for supplying heating fluid to the heat exchanger coil. Similarly, body portion 12 constitutes a fluid return portion with passage 20 being a coil return passage connected to receive fluid returning from the heat exchanger coil, passage 21 is a return passage for connection to the heating fluid return line and passage 22 is a return passage for connection to the cooling fluid return line. Body portion 13 constitutes a cooling fluid distribution portion of the valve wherein passage 25 is a supply passage for cooling fluid, passage 27 is a bypass return passage for cooling fluid, and passage 26 is a coil supply passage for cooling fluid.

Figure 5:
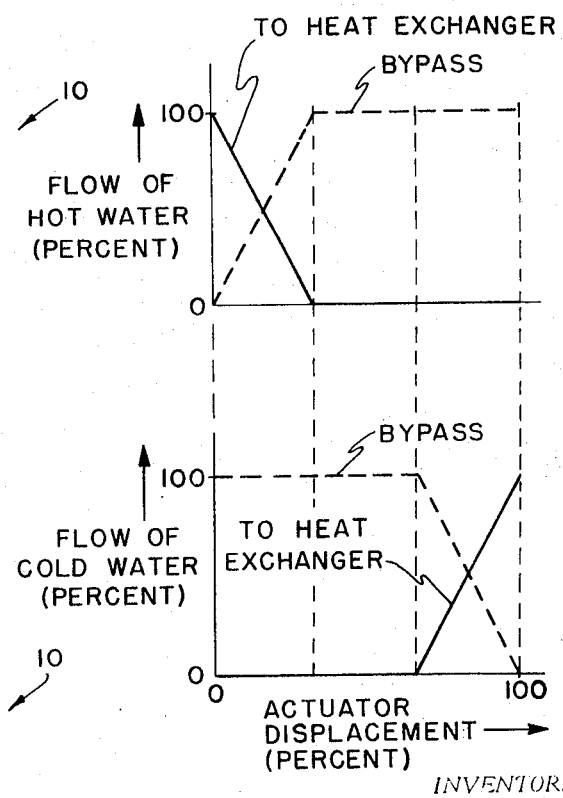
FIGURE 5 is a graph showing the manner in which the fluid is conveyed in the various positions of the valve.

The valve is constructed to define three distinct operating or control positions although modulation is provided between these positions. The first of these positions is that occupied by the valve components in FIGURES 1 and 2. In this position actuating member 40 is in its uppermost position. This defines a first control position wherein cam member 42 is held in an upper position and spring 50 compressed thereby so that should actuating member 40 move downward, cam member 42 will move with it until it reaches a position where it engages the surface surrounding opening 51. In this first position, valve 34 is held fully open while valve 33 is fully closed. The stems of both valves 33 and 34 are in engagement with the pins on cam 42 so that upon any downward movement of actuating member 40, valve 33 will begin to open and valve 34 will begin to close. In the first control position pin 43a on cam 43 engages the stem on valve 35 and holds it in a fully open position. Pin 43b is spaced a substantial distance from the stem of valve 36 so that valve 36 is fully closed and will remain closed until cam 43 is moved downward a substantial amount. In this first control position snap ring 52 is in recess 54 and spaced a substantial distance from the upper side of cam 44 which is held into engagement with the surface of body member 13 surrounding opening 54 by spring 53. In this position pin 44a engages the upper side of the stem on valve 37 which is fully closed. Pin 44b engages the underside of the stem on valve 38 and holds it in a fully open position. With the valve in this position the flow is as disclosed at the zero actuator displacement position in the graph of FIGURE 5. Herein heating fluid flows into passages 14, past valve 34, through passage 16, to heat exchanger 60, through passage 20, past valve 35, into passage 21 and to the hot water return. Cold water flows into passage 25, past valve 38, into passage 27 and to the cold water return. Since valve 36 is closed there is no mixing with the hot water in passage 20 and since valve 37 is closed none of the cold water can flow to the heat exchanger.

As actuating member 40 is moved downward from the first control position, valve 33 is gradually opened and valve 34 gradually closed. At the same time valve 35 is gradually closed but no movement is imported to valve 36 because of the spacing between pin 43b and the stem on valve 36 and no movement is imparted to valves 37 and 38 because of the lost motion connection between actuating member 40 and cam 44. The opening of valve 33 permits a portion of the heating fluid to be connected directly to the hot water return line thus bypassing the heat exchanger. The simultaneous closing of valves 34 and 35 not only results in bypassing a portion of the heating fluid, but in a gradual addition to the impedance to fluid flow through the heat exchanger. By this arrangement, a constant flow is maintained through the valve regardless of the amount being supplied to the heat exchanger. During this movement the entire amount of cooling fluid is bypassed directly to return.

Figure 3:
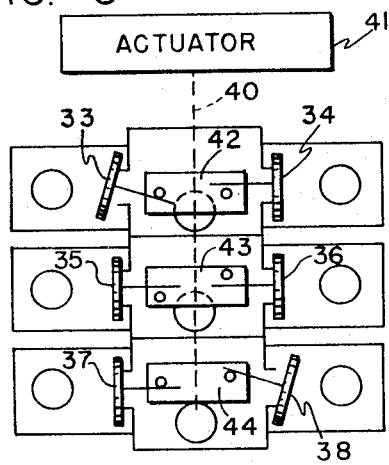
FIGURE 3 discloses schematically the valve in a second control position.

After a predetermined amount of downward movement of actuating member 40, a second control position, as shown in FIGURE 3, is reached. In this position valve 33 is fully open while valves 34 and 35 are fully closed. Valves 36, 37 and 38 are still in the initial position. In this position both the heating and cooling fluids are fully bypassed and no fluid is supplied to the heat exchanger but a constant flow of both heating and cooling fluids through the system is still maintained. Preferably, this second control position is actually a band or span of movement of actuating member 40, as distinguished from a distinct position thereof. This is desirable to allow for tolerances in the manufacture of the valve and to assure that both heating and cooling fluids are never supplied to the heat exchanger at the same time. This band may cover a substantial portion of the movement of the actuator as is shown by way of example in the graph in FIGURE 5. This band may be provided by the strategic placement of the cam pins on the cam members.

As actuating member 40 moves further downward from the second control position, snap ring 52 engages the upper portion of cam 44 and begins to move it downwardly. Pin 43b engages the stem of valve 36 and thus valves 36 and 37 are gradually opened and valve 38 is gradually closed. This causes the amount of cold water being bypassed directly to the cold water return to be decreased and to gradually supply a portion of the cold water to the heat exchanger. When the actuating member is in its second control position, cam 42 is engaging the surface around opening 51 and upon further downward movement by member 40, snap ring 47 moves into opening 51 so that this movement of the actuating member does not result in further movement of valves 33 and 34.

Figure 4:
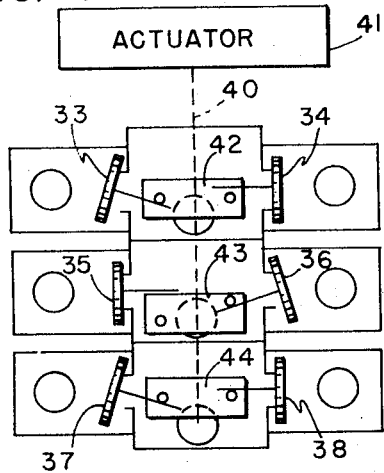
FIGURE 4 discloses schematically the valve in a third control position.

Ultimately, actuating member 40 reaches its lowermost or third control position as shown schematically in FIGURE 4. In this position valves 35 and 38 are fully closed and valves 36 and 37 are fully open. In this position the hot water continues to be bypassed directly to its return pipe while the cold water bypass is fully closed and the entire amount of cold water is circulated through the heat exchanger.

Upon movement of actuating member 40 in an upward direction, the operation will be exactly the reverse of that described above. It will be appreciated that while there are three main control positions, the valve actuator may be disposed in any intermediate position depending upon the particular demand for heating or cooling. In every position of the valve there is a constant flow of both heating and cooling fluids through the valve so that the circulating pumps for these fluids may operate continuously and so that a supply of both heating and cooling fluids is immediately available upon demand.

The embodiments of the invention in which an exclusive property or right is claimed are defined as follows:

1. A constant flow valve for controlling the flow of heating and cooling fluids to a heat exchanger in a four-pipe system comprising:

valve body means including first, second and third body portions;
said body portions each including first, second and third fluid passages, first and second valve seats separating said first and second, and said first and third, fluid passages, respectively, and first and second valve closure members associated with said first and second valve seats, respectively, and movable between open and closed positions to control fluid flow therethrough;
actuating means including an actuating member movable between first, second and third positions to control the positions of all of said closure members;
said actuating means including means moving said first closure member in said first body portion from open to closed position and moving said second closure member therein from closed to open position upon movement of said actuating member from said first to said second position and maintaining said first and second closure members in said first body portion in their closed and open positions, respectively, upon movement of said actuating member from said second to said third position;
said actuating means also including means maintaining the first closure member in said second body portion closed and moving said second closure member therein from open to closed position upon movement of said actuating member from said first position to said second position, and maintaining said second closure member closed and moving said first closure member from closed to open position upon movement of said actuating member from its second to its third position; and
said actuating means including further means maintaining the first closure member in said third body portion open and the second closure member therein closed when said actuating member is in said first or second positions and during movement therebetween, and closing said first closure member and opening said second closure member upon movement of said actuating member from said second to said third positions.

2. The constant flow valve of claim 1 wherein:
the actuating means includes spring means biasing each of said valve closure members to one of said open and closed positions, cam means cooperable with said valve closure members to move them in opposition to said spring means, and means operably connecting said cam means and said actuating member for movement therewith.

3. The constant flow valve of claim 2 wherein:
said cam means includes a first cam member cooperable with the valve closure members in said first body portion, a second cam member cooperable with the valve closure members in said second body portion and a third cam member cooperable with the valve closure members in said third body portion; and
the means operably connecting said cam means to said actuating member includes lost motion means between said first cam member and said actuating member and arranged so that said first cam member is moved only during movement of said actuating member from its first to its second position, and lost motion means between said third cam member and said actuating member and arranged so that said third cam member is moved only during movement of said actuating member from its second to its third positions.

4. The constant flow valve of claim 3 wherein:
the first, second and third body portions are substantially identical and are disposed with their first passages aligned;
said first, second and third cam members are disposed in the first passages of said first, second and third body portions, respectively;

said actuating member extends through the first passage in each of said body portions; and said valve closure members are poppet valves, each having a portion disposed for engagement by one of said cam members and movement thereby.

5. The constant flow valve of claim 4 wherein:
the first passage of said first body portion is a supply passage for connection to a heating fluid supply line;
the second passages of said first and second body portions are return passages for connection to a heating fluid return line;
the third passage of said first body portion is a coil supply passage for connection to a heat exchanger coil;
the first passage of said second body portion is a coil return passage for connection to a heat exchanger coil;
the third passages of said second and third body portions are return passages for connection to a cooling fluid return line;
the first passage of said third body portion is a supply passage for connection to a cooling fluid supply line; and
the second passage of said third body portion is a coil supply passage for connection to a heat exchanger coil.

6. The constant flow valve of claim 1 wherein:
said first body portion constitutes a heating fluid distribution portion with the first passage therein being a supply passage for connection to a heating fluid supply line, the second passage therein being a return passage for connection to a heating fluid return line, and the third passage therein being a coil supply passage for connection to a heat exchanger coil;
said second body portion constitutes a fluid return portion with the first passage therein being a coil return passage for connection to a heat exchanger coil, the second passage therein being a return passage for connection to a heating fluid return line, and the third passage therein being a return passage for connection to a cooling fluid return line; and
said third body portion constitutes a cooling fluid distribution portion with the first passage therein being a supply passage for connection to a cooling fluid supply line, the second passage therein being a coil supply passage for connection to a heat exchanger coil, and the third passage therein being a return passage for connection to a cooling fluid return line.

7. The constant flow valve of claim 1 wherein:
said first, second and third body portions are substantially identical and are arranged with the first passages therein aligned;
said actuating means includes a first cam member in the first passage of said first body portion and cooperable with the valve closure members therein, a second cam member in the first passage of said second body portion and cooperable with the valve closure members therein, and a third cam member in the first passage of said third body portion and cooperable with the valve closure members therein;
said actuating member extends through the first passages of said first, second and third body portions; and
said actuating means further includes means operably connecting said first, second and third cam members to said actuating member for movement thereby.

8. The constant flow valve of claim 7 wherein:
the means operably connecting said cam members to said actuating member includes lost motion means constructed and arranged so that said first cam member is moved by said actuating member only during movement thereof from its first to its second position, and said third cam member is moved by said actuating member only during movement thereof from its second to its third position.

References Cited

UNITED STATES PATENTS 2,431,944    12/1947    Lauck et al. _____ 137—636 XR
2,539,221    1/1951    Badeaux _____ 137—599.1

WILLIAM F. O'DEA, Primary Examiner

R. G. NILSON, Assistant Examiner

U.S. Cl. X.R.

137—597, 599.1, 601, 607, 630.19, 636